Patented May 23, 1933

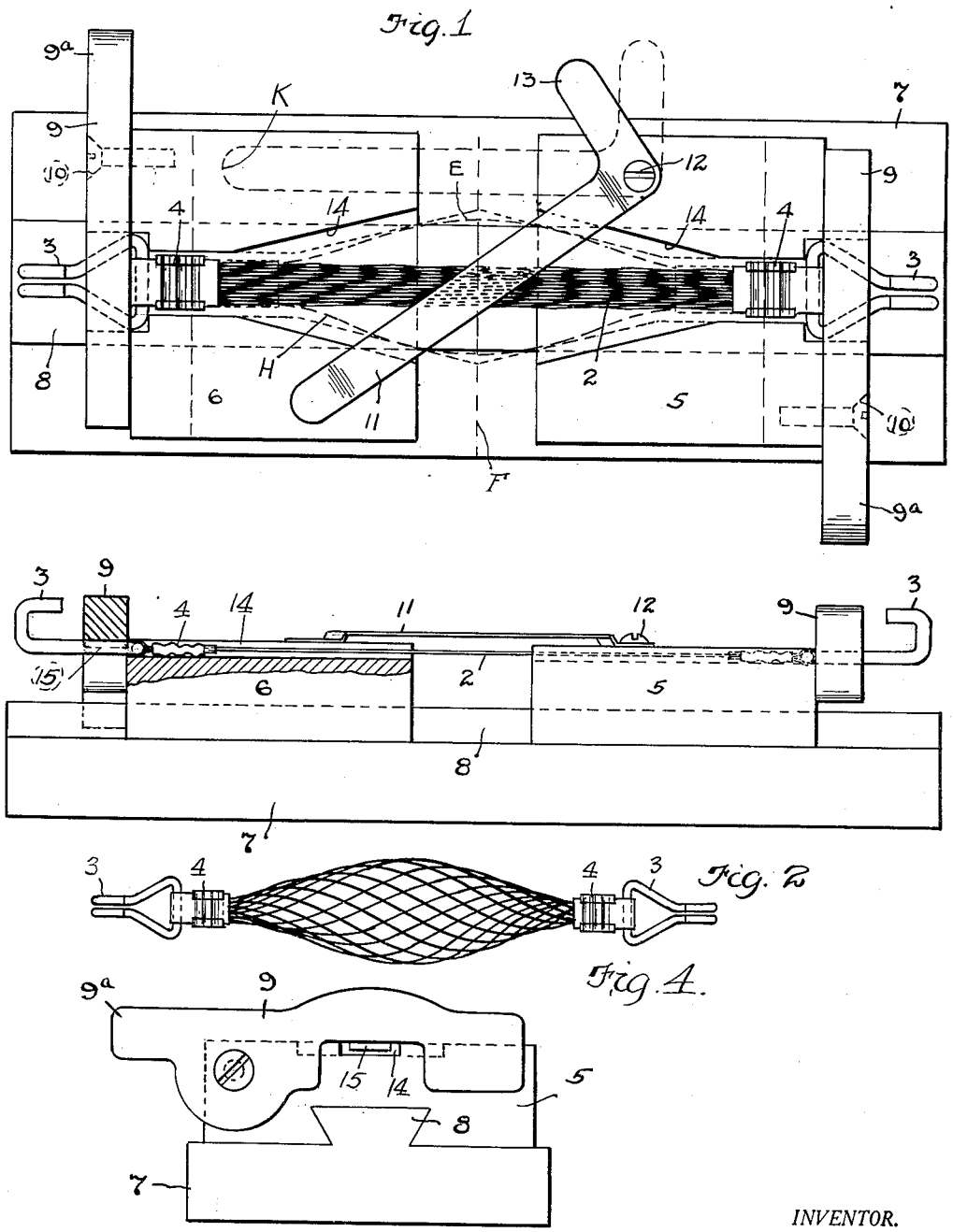

1,910,323

UNITED STATES PATENT OFFICE

GEORGE R. CUNNINGTON, OF AKRON, OHIO, ASSIGNOR, BY MESNE ASSIGNMENTS, TO THE GENERAL TIRE & RUBBER COMPANY, OF AKRON, OHIO, A CORPORATION OF OHIO

METHOD AND APPARATUS FOR FORMING WIRE REENFORCING ELEMENTS

Application filed February 11, 1930. Serial No. 427,616.

This invention relates to a method of and apparatus for manufacturing reenforcing elements and particularly to such elements for use in tire chain non-skid links of the type shown in my copending applications Serial Nos. 222,240 and 290,894, filed September 27, 1927 and July 7, 1928, respectively.

One of the objects of the present invention is to provide a novel method of forming reinforcements for non-skid links wherein such links can be expeditiously and uniformly manufactured.

Another object is to provide a novel method of shaping reinforcing elements for non-skid links from blanks formed of a plurality of longitudinally extending interlaced wire elements.

Another object is to provide a method of expanding a blank formed of a plurality of longitudinally extending interlaced wire elements to a shape suitable for use as a reinforcing element for non-skid links.

A further object is to provide a method of manufacturing non-skid link reinforcements from blanks of longitudinally extending interlaced wire elements whereby the blank may be expanded laterally to a predetermined substantially diamond shape.

A still further object is the provision of suitable apparatus for expanding the blank herein described, which is capable of rapid operation and which does not require a high degree of skill on the part of the operator.

With the above and other objects in view, the present invention may be said to comprise the method of and apparatus for manufacturing reinforcing elements to be hereinafter described with reference to the accompanying drawing, and then claimed, together with such changes and modifications thereof as will be apparent to one skilled in the art to which the present invention appertains.

Referring to the accompanying drawing:

Fig. 1 is a plan view of one form of apparatus which may be used in carrying out the method of the present invention, a suitable blank from which the element is to be formed, being shown in position therein; Fig. 2 is a side elevation of the apparatus shown in Fig. 1; Fig. 3 is an end elevation of the apparatus shown in Fig. 1; and Fig. 4 is a plan view of the completed article.

In my copending applications previously referred to, the non-skid link is shown to comprise a reenforcing element formed of a plurality of longitudinally extending interlaced wire elements, such as flat braided bead wire employed in the manufacture of pneumatic tire beads, which is expanded laterally to a substantially diamond shape. The ends of the element, however, are held against expansion by holding the wire elements against separation, so that the element is in effect convergently expanded from the ends toward the central zone thereof. This expanded elements is embeded in a suitable rubber material, the rubber being vulcanized and extending through interstices between the wire elements.

The method of the present invention therefore contemplates the formation of a flat blank of braided wire elements to a shape corresponding to that above described so that the element can be embedded in a body such as a non-skid link to suitably reenforce the same.

The material from which the reenforcing element is formed, as shown in Figs. 1 and 2, comprises a flat strip or blank 2 formed of a plurality of longitudinally extending interlaced wire elements, such as flat braided bead wire. The blank 2 is cut to a suitable predetermined length and is provided at its ends with suitable terminal hooks 3 which are secured thereto by sheet metal clips 4 extending through the hooks and being crimped or otherwise secured to the ends of the blank 2.

In general, the blank 2, after having the terminal clips 4 secured thereto which hold the ends of the wire elements against separation, is compressed endwise to laterally expand the blank, the blank during such lateral expansion being held against movement perpendicular to the flat sides thereof. Since the wire elements at the ends of the blank are held against separation, it is obvious that the blank will laterally expand in progressively greater amounts from the clamped ends toward the center thereof. The resultant expanded blank thus substantially assumes a diamond shape, as shown in Fig. 4.

By such treatment, the blank is permanently deformed from a contour of uniform width to a contour having a widened central zone, it being correspondingly shortened throughout. If the blank employed be of stock comprising longitudinal wires held together by lighter binding or weaving wires extending across the longitudinal wires, readjustment of the relationship therebetween will readily occur on expansion. If the blank be of the preferred form consisting of longitudinally extending interlaced wire elements, in which the wire elements are of substantially the same character throughout, the expansion will occur by a widening out of what corresponds to the mesh therebetween.

The apparatus shown in the drawing is clearly indicative of one form of means which may be employed in carrying out the present invention as just described. This apparatus as illustrated, comprises a pair of coacting die members 5 and 6 mounted for sliding movement upon a suitable base 7. One means of providing such sliding movement is to form a dovetail portion 8 on the upper surface of the base 7, which engages a mating portion or recess in the die members 5 and 6. The dies 5 and 6 may be arranged to slide toward each other as will be hereinafter described, or if desired, one of the die members may be locked against movement, only the other die member being arranged to slide relative to the one which is locked against movement.

Each of the dies is formed with a cavity 14 in its upper surface, the sides of which converge from its outer end to its inner end, so that when the two die members engage each other, the united expansion cavities 14 correspond to the general shape of the finished article. The outer ends of the cavities 14 are provided with parallel sides to receive the ends of the blank 2.

A suitable means for clamping the ends of the blank against movement relative to the die members is provided and each may comprise, as shown in the drawing, a lever 9 pivoted to the end face of the die member by means of a bolt or cap screw 10. The lever 9 is preferably pivoted intermediate its ends, so that the portion 9a projecting beyond the side of the die may be swung downwardly to release the end of the blank 2. The lever 9 is preferably provided with a projection 15 on its lower edge face which, when the blank 2 is clamped in position, extends through the terminal 3 and engages the end of the terminal securing clip 4.

When the blank 2 is in position ready to be expanded, it seats against the bottoms of cavities 14 in the die members 5 and 6, the ends being clamped against movement relative to the die members. It is thus seen that the cavities having side walls converging toward a meeting point, provides an expansion zone of the shape of the formed article.

With the blank 2 so clamped in position, the dies 5 and 6 are moved toward each other by mechanical or manual means until they abut, which position is indicated by the broken line F in Fig. 1. During this movement of the die members, longitudinal pressure is exerted against the ends of the blank 2 and the blank is caused to laterally expand in the cavities to the shape represented by the broken contour line H in Fig. 1.

Movement of the blank in a direction perpendicular to the plane of the sides thereof is prevented by providing a means which overlies the cavities. This may comprise a hinged plate or any other suitable means such as the horizontally swingable lever 11, illustrated, pivoted by a screw 12 to the upper side of the die 5. The lever 11 may be provided with a crank portion 13 so that it can be easily swung to the position indicated by the broken line K in order to permit the formed article to be removed from the die cavities.

It is clearly obvious, since longitudinal pressure is exerted against the ends of the blank, and since the blank is restrained against movement perpendicular to the sides thereof, that during the compressing movement of the coacting dies 5 and 6, the blank is forced to laterally expand to the position shown by the outline H, and that such expansion is limited to the combined shape of the cavities 14.

The completely formed article, as shown in Fig. 4, is comprised of a plurality of interlaced wire elements which are gradually separated or spread apart greater amounts as they approach the center thereof. In other words, the reenforcing element is laterally expanded in its central zone and has its sides gradually diverging from a central transverse plane in opposite directions toward the ends thereof.

It is to be clearly understood that the lateral expansion of the blank 2 intermediate its ends may be accomplished by simultaneously moving both die members toward each other as above described by any suitable mechanism, either manual or mechanical, or that it may be also accomplished by holding one of the dies stationary and moving the other die toward the same.

It is to be particularly noted that the present invention provides a novel and efficient method of forming expanded reenforcing members of braided wire which lends itself to uniformity of the completed article.

It is further noted that a simple and efficient mechanism is provided for carrying out the method of the present invention.

Aside from the specific embodiments of the invention herein shown and described it will be understood that numerous details of construction may be altered or omitted without departing from the spirit and scope of this invention, and it is not the desire to limit the invention to the exact construction herein set forth, as it is desired to claim the invention broadly as well as specifically as indicated in the appended claims.

Other modes of applying the principle of the invention may be employed, change being made as regards the details described, provided the means stated in any of the following claims, or the equivalent of such, be employed.

I therefore particularly point out and distinctly claim as my invention:—

1. The method of forming reenforcing elements from flat blanks formed of a plurality of longitudinally extending interlaced wire elements, which comprises rigidly clamping the wire elements together in a clip terminal member at each end of said blank, holding said blank against movement perpendicular to the plane thereof, and longitudinally moving the ends of said blank toward each other to laterally expand said blank to predetermined shape in a form defining cavity to provide a blank of increasing lateral width toward the center thereof.

2. The method of forming reenforcing elements from flat blanks formed of a plurality of longitudinally extending interlaced wire elements, which comprises binding the wire elements together at each end of said blank, and then laterally expanding said blank in the plane thereof progressively greater amounts from the ends toward the center thereof to form a flat element of interlaced wire elements having interstices of increasing size inwardly of the ends thereof.

3. The method of forming reenforcing elements from flat blanks formed of a plurality of longitudinally extending interlaced wire elements, which comprises holding the extreme ends of said blank against separation of the wire elements thereof, and then laterally expanding said blank in the plane thereof progressively greater amounts from the ends toward the center thereof by longitudinally moving the ends of said blank toward each other.

4. The method of forming reenforcing elements from flat blanks formed of a plurality of longitudinally extending interlaced wire elements, which comprises holding the extreme ends of said blank against separation of the wire elements thereof, restraining said blank against movement perpendicular to the faces thereof, and then laterally expanding said blank progressively greater amounts from the ends toward the center thereof.

5. The method of forming reenforcing elements from flat blanks formed of a plurality of longitudinally extending interlaced wire elements, which comprises holding the extreme ends of said blank against separation of the wire elements thereof, restraining said blank against movement perpendicular to the faces thereof, and then laterally expanding said blank progressively greater amounts from the ends toward the center thereof by longitudinally moving the ends of said blank toward each other.

6. The method of forming substantially diamond-shaped reenforcing elements from a flat blank of closely associated longitudinally extending wires, which comprises restraining said blank against substantial movement perpendicular to the faces thereof, clamping the wires at each end of said blank against separation, and then longitudinally moving the ends of said blank toward each other to laterally expand said blank to substantially diamond-shaped form intermediate it ends.

7. Apparatus for forming reenforcing elements from blanks of interlaced longitudinally extending wires, comprising spaced means for holding the blanks against movement perpendicular to the faces thereof, and means for moving the ends of the blank toward each other.

8. Apparatus for forming reenforcing elements from blanks of interlaced longitudinally extending wires, a pair of spaced dies, means for clamping the ends of the blank to said dies, spaced means for preventing movement of the blank relative to the faces thereof, and means for providing movement of at least one of said dies toward the other.

9. Apparatus for forming reenforcing elements from blanks of interlaced longitudinally extending wires, a base, a pair of coacting dies, at least one of said dies being movable on said base toward the other, each having a divergent cavity therein for receiving the blank to be formed, means for clamping the ends of said blank to said dies, a cover member overlying said passageways, and means for moving one of said dies toward the other whereby said blank may be laterally expanded progressively greater amounts from the ends toward the center thereof.

Signed by me this 6th day of February, 1930.

GEORGE R. CUNNINGTON.